Jan. 7, 1947. P. E. FENTON 2,413,702
HAND TOOL FOR SETTING SNAP FASTENERS
Filed May 29, 1945
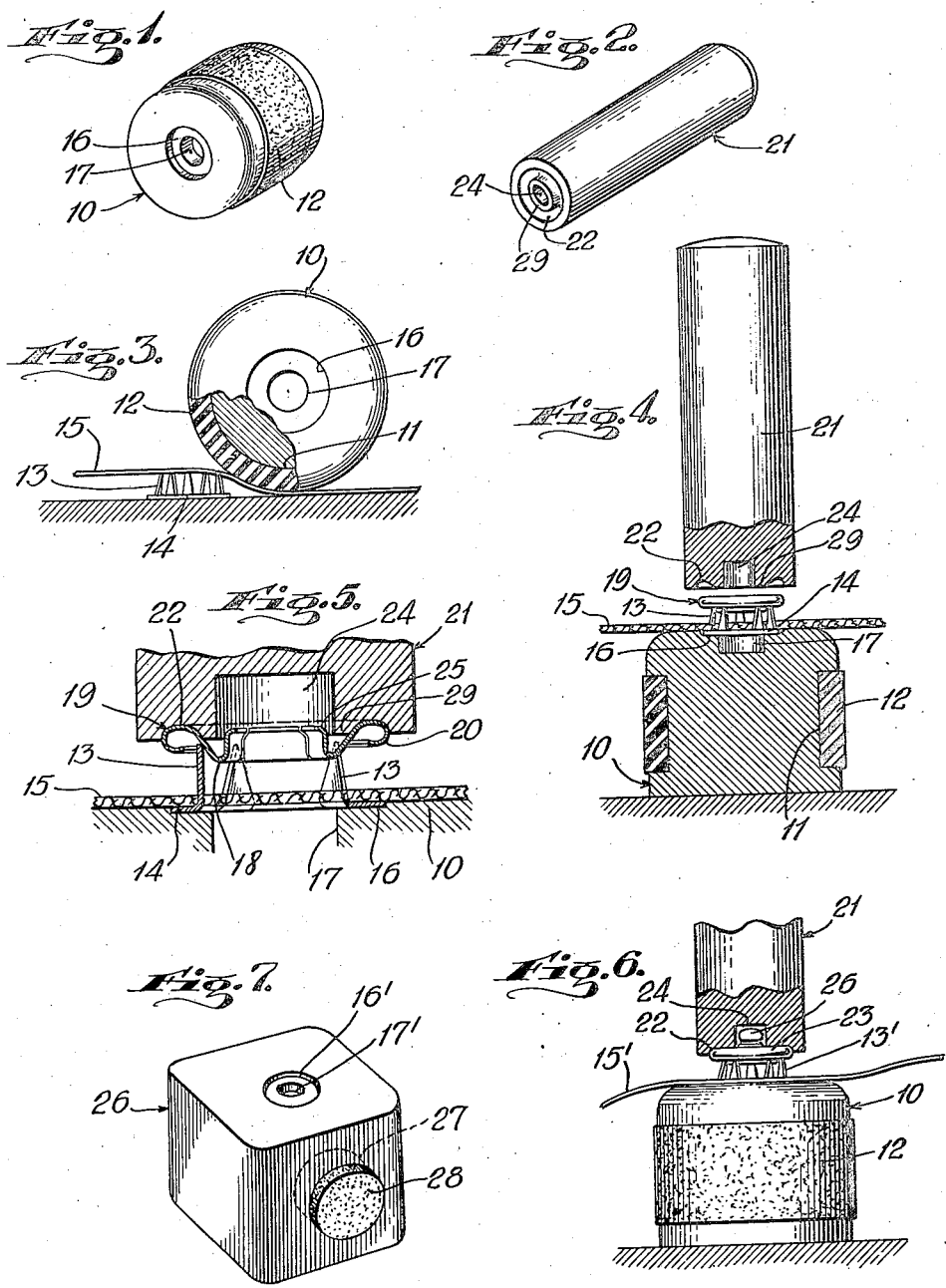
INVENTOR
PAUL E. FENTON
BY
ATTORNEY Patented Jan. 7, 1947

2,413,702

UNITED STATES PATENT OFFICE 2,413,702

HAND TOOL FOR SETTING SNAP FASTENERS

Paul E. Fenton, Middlebury, Conn., assignor to Scovill Manufacturing Company, Waterbury, Conn., a corporation of Connecticut Application May 29, 1945, Serial No. 596,426

3 Claims. (Cl. 218—20)

This invention relates to hand tools made and used for setting stud and socket parts of snap fasteners onto respective supports. More particularly, the invention deals with tools of this type and kind which are inexpensive in construction and which can be used by anyone to secure snap fastener devices to garments or other supports in the manner of hand applying buttons, hooks and eyes and other fasteners to garments, thus making it possible for individuals to make garments or any type or kind of product or article having snap fastener devices thereon, rather than to be compelled to use buttons, hooks and eyes and other types of fasteners, particularly when the snap fasteners employ pronged rings for securing the socket and stud parts to the respective supports. The novel features of the invention will be best understood from the following descriptions when taken together with the accompanying drawing in which certain embodiments of the invention are disclosed and in which the separate parts are designated by suitable reference characters in each of the views; and in which:

Fig. 1 is a perspective view of one form of tool which I employ.

Fig. 2 is a perspective view of a companion tool.

Fig. 3 is a side and sectional view diagrammatically illustrating the manner of using the tool of Fig. 1, attaching a support to the prong ring of a fastener.

Fig. 4 is a side and sectional view showing the use of both of the tools in attaching a socket member to a pronged ring in attaching the socket member to a support.

Fig. 5 is an enlarged sectional detailed view through a socket member and ring preparatory to extending the prongs of the ring outwardly into the reversely curved peripheral flange of the socket.

Fig. 6 is a side view of the tool showing only part of one of the tools, and indicating the attachment of a stud to a pronged ring and support with part of the construction shown in section; and Fig. 7 is a perspective view of a modified form of tool which I employ.

In snap fasteners employing pronged rings for securing the socket and stud parts to the supports, it has been the practice for the manufacturer of garments or other articles, utilizing such fasteners, to apply the fasteners to the garment. In other words, fasteners of this type and kind have not been available to the public, to enable individuals to mount fasteners of this kind in homemade garments or other articles on which fasteners of this type and kind could be practically used. It is the purpose of my invention to provide simple economical form of tools which can be purchased at a very reasonable price to enable the public as a whole to purchase and install snap fasteners of the kind under consideration.

In Figs. 1 to 6 inclusive, I have shown one combination of tools, whereas in Fig. 7, a modification of one of the tools is disclosed.

In Figs. 1 to 6, 10 represents one tool which is in the form of a cylindrical type of body, which may be composed of wood, metal or plastic material. This body has a circumferential groove 11 in which is fitted a relatively heavy rubber ring 12, preferably crepe rubber, utilized in roller-like fashion to pierce the prongs 13 of a mounting ring 14 through a support 15, as diagrammatically illustrated in Fig. 3 of the drawing. In other words, in rolling the tool 10 over a surface of the support 15 and the upstanding prongs 13 of the ring 14, the prongs are forced through the support, producing the result substantially similar to that illustrated in Figs. 4 and 5.

The tool 10 also has on one surface thereof impressions comprising a large diameter shallow socket 16 inwardly of which is a smaller diameter and deeper socket 17. The first socket is adapted to receive the ring 14, as clearly seen in Fig. 4 of the drawing, whereas the socket 17 is adapted to receive the projecting portion 18 of a socket member 19 of a snap fastener in the operation of securing the ring 14 to the socket member 19. That is to say, in flaring the prongs 13 outwardly into the reversely curved flange 20 of the socket member 19, as will clearly appear from a consideration of Fig. 5. These fasteners are well known in the art, and the method of attachment is old, and for this reason, no specific showing of the fastener assemblage is made. However, it is quite apparent from the drawing just what the results of the attachment would be.

The companion tool 21 is shown in Figs. 2, 4, 5 and 6 of the drawing. This tool is more or less in the form of a punch and comprises an elongated rod or cylinder having at one end impressions comprising an annular recess 22 adapted to seat upon the flange portion 20 of the socket member 19, as well as the stud member 23, shown in Fig. 6 of the drawing. Inwardly of the recess 22 is a deep aperture 24 which is adapted to receive the spring arms 25 of the socket part 19, and the stud 26 of the stud member 23. It will be apparent from a consideration of Fig. 5 of the drawing that by arranging the parts upon the tool 10 with the tool 21 disposed upon the socket member 19, all that will be necessary is to apply a blow with a hammer or other tool upon the upper end of the tool 21, in which operation, the prongs 13 will be flared outwardly into the flange 20, thus firmly securing the socket member 19 to the support 15.

In Fig. 6 of the drawing I have shown the upwardly directed prongs 13' of a ring, similar to the ring 14, adapted for attachment to the stud member 23. In this figure, 15' represents another support to which the stud member 23 is to be secured. The tools 10 and 21 are identical with the tools shown in Figs. 1 to 5 inclusive.

In Fig. 7 of the drawing is shown a slight modification in one of the tools, that is to say, a substitute for the tool 10. In Fig. 7, a tool block 26 of more or less rectangular form is employed, instead of the cylindrical form of tool 10. One side surface of the block 26 has an aperture, as seen at 27, to receive a large rubber or other cushion plug 28, the diameter of which will be greater than the diameter of the pronged rings employed and instead of a rolling operation, as contemplated with the tool 10, a tool 26 may be struck by hand or otherwise in driving the prongs through a support, as will be apparent. The plug 28 may be composed of crepe rubber. Another surface or end of the tool block 26 is provided with impressions comprising a shallow large diameter socket 16', similar to the socket 16, and a smaller diameter deeper socket 17', similar to the socket 17. The sockets 16' and 17' are utilized in the same manner as the socket 16 and 17 of the tool 10, and thus no further description with regard to the use of the tool 26 is necessary.

It will be apparent that tools of the type and kind under consideration will be made in sizes to suit snap fasteners of different diameters and will also be modified to conform with different structures in the snap fasteners employed. However, it is contemplated that the tools will be sold in conjunction with types and styles of fasteners sold to the consumer in bulk for domestic uses. This is made possible by reason of the economy of construction of the tools. In other words, a unit package comprising a predetermined number of pairs of fasteners and the tools could be sold.

The tools 10 and 26 may be said to comprise die blocks or anvil members, whereas the tools 21 may be referred to as a punch member. Collectively, the tools form a pair of members for assembling or mounting first the pronged ring parts on the support, and then the joining of the pronged ring with the socket and stud members for attachment to the support.

In considering the punch tool 21, it will appear that the two recesses or apertures 22 and 24 forming the impressions of the tool also produce between the two apertures an annular wall portion 29, and this wall portion forms a support for the socket part 19, as noted in Fig. 5, which reinforces the socket part in the flaring of the prongs 13 into the reversely curved flange 20 of the socket part. In other words, the walls of the socket part 19, and this is also true of the stud part 23, are supported and reinforced by the tool 21, so as to in no way distort these parts in the assemblage onto a support. In the same manner the base of the prongs 13 are directly supported by the anvil tool 10.

Having fully described my invention, what I claim as new and desire to secure by Letters Patent is:

1. A tool for securing pronged snap fastener parts to a support, said tool comprising a substantially solid cylindrical member, said member having inwardly of side surfaces thereof a wide annular groove, a yieldable and pierceable body in said groove, the thickness of said body being greater than the depth of said groove to circumferentially expose said body on said member, and the yieldable body being adapted to be rolled over the surface of a support and upstanding prongs of a prong fastener part in piercing the prongs of said fastener part through the support.

2. A tool for securing pronged snap fastener parts to a support, said tool comprising a substantially solid cylindrical member, said member having inwardly of side surfaces thereof a wide annular groove, a yieldable and pierceable body in said groove, the thickness of said body being greater than the depth of said groove to circumferentially expose said body on said member, the yieldable body being adapted to be rolled over the surface of a support and upstanding prongs of a prong fastener part in piercing the prongs of said fastener part through the support, and one side surface of said member having an impression conforming with and adapted to snugly receive and support said pronged fastener part in coupling an associated fastener part therewith.

3. A tool for securing pronged snap fastener parts to a support and to a companion fastener part, said tool comprising a substantially solid member, said member having inwardly of side surfaces thereof a large recess opening outwardly through the periphery of said member, a yieldable and pierceable body in said recess, the thickness of said body being greater than the depth of the recess in said member to extend said body beyond the outer surface of said member adjacent the recess therein, said yieldable body being adapted to pierce the prongs of the fastener part through a support by pressure applied to said member, and one of said side surfaces of said member having an impression conforming with and adapted to snugly receive and support the pronged fastener part in coupling an associated fastener part therewith.

PAUL E. FENTON.